H. N. POTTER.
SEPARATOR FOR REMOVING VEGETABLE GROWTHS AND COARSE MATERIAL FROM GRAVEL AND THE LIKE.
APPLICATION FILED MAR. 22, 1913.
1,134,555. Patented Apr. 6, 1915.
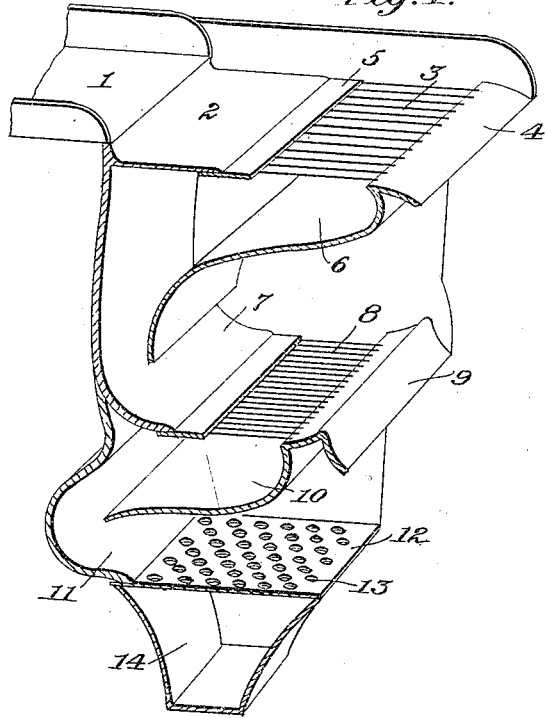
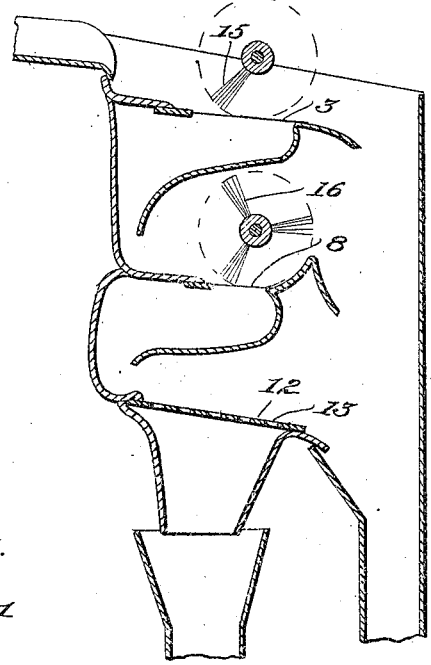
Witnesses:
J. W. Harris
E. L. Tate
Inventor:
Henry Noel Potter,
by Byrnes, Townsend & Breckenstein
Att'ys.

UNITED STATES PATENT OFFICE.

HENRY NOEL POTTER, OF HOLLYWOOD, CALIFORNIA.

SEPARATOR FOR REMOVING VEGETABLE GROWTHS AND COARSE MATERIAL FROM GRAVEL AND THE LIKE.

1,134,555.　　　　Specification of Letters Patent.　　Patented Apr. 6, 1915.

Application filed March 22, 1913. Serial No. 756,25.

*To all whom it may concern:*

Be it known that I, HENRY NOEL POTTER, a citizen of the United States, residing at Hollywood, in the county of Los Angeles and State of California, have invented certain new and useful Improvements in Separators for Removing Vegetable Growths and Coarse Material from Gravel and the like, of which the following is a specification.

My invention relates to an apparatus intended more particularly for separating fine dirt, clay, sand, gravel, etc., from grass, roots, and other fibrous vegetable matter; also from the coarse sizes of gravel, stones, rock, etc., generally associated therewith in gravel banks, sand bars, etc.

The object of my invention is to provide a means whereby a mass of dirt from a gravel bank, placer-deposit, etc., and containing all sizes of gravel and stones mixed with clay and sand in varying proportions, and a large amount of vegetable growths, such as grass, weeds, roots, etc., and with a supply of water, may be screened; the fine sand and gravel being separated from the coarse stones, long fibrous vegetable growths and other matter that would interfere with the recovery of any fine material, such as values etc., in placer mining.

The apparatus comprises one or more devices having longitudinally extended interspaces open at the discharge ends hereinafter referred to as a "comb" or "combs," combined with a perforated or woven screen, so arranged that the feed of the gravel-bank or placer-deposit material is supplied to the comb which permits the fine clay, sand, and small gravel to pass through, but excludes the coarse gravel and most of the vegetable matter. A second comb usually having narrower interspaces may be placed below the first, or beyond the first, in the line of movement of the fines from the preceding comb, and serves to remove still more coarse gravel and fibrous vegetable matter from the fines delivered by the first comb. A perforated plate or woven wire screen, having apertures larger than the width of the interspaces in the fine comb, is placed below the fine comb, or beyond and in series with it, and serves to catch the last of the fibrous vegetable matter, pieces of mica, etc., that pass the fine comb; the quantity of such growths that collect on the screen does not clog it to an objectionable point in practice until after a considerable time, generally an hour or longer, when it is removed in any suitable manner. The material passing through the apertures of the plate or screen is treated in any suitable manner to recover the fines, sands, values, etc., that the gravel or placer-deposit may contain.

The fibrous vegetable matter referred to consists of long slender flexible roots, grasses, etc., and in practice they become entangled in the apertures of screens, thereby reducing their capacity, and further rendering it difficult to remove them.

One of the advantages of using combs in a screen of this character is that such entangled fibrous vegetable matter can be readily removed by sliding out of and off the teeth at their open ends.

In the annexed drawings:—Figure 1 is a view in perspective of one form of my separator, with one side removed; Fig. 2 is a vertical cross-section of another form showing rotating brushes to remove the coarse stones, vegetable growths, etc., from the combs; Fig. 3 shows two separators, placed back to back; and Fig. 4 is a section of a portion of the screen-plate showing the shape of the aperture.

The above figures are diagrammatic only.

In Fig. 1, a launder 1, through which gravel, etc., is fed, empties on a suitable plate or apron 2, which in turn empties on a comb 3, the teeth or tines of which are made of wires or rods with their free ends projecting over a ledge 4. The upper end 5 of the comb is supported below the apron 2 in a manner as to permit its ready removal, as for repairs, etc. The material supplied to the comb 3 consists of a mass of clay, sand gravel, stones, vegetable fibers, etc., with water, as above noted; and is in practice usually the fines from a coarse, grizzly or rotary screen of some well known form which removes bowlders, brush, and other extremely coarse oversize; the clay, sand, earth, etc., called the fines, passing through the interspaces between the teeth or tines of the comb 3 to the deflector 6 below; while the coarser stones, fibrous vegetable growths, etc., called the oversize, pass over the ledge 4 into a suitable channel or waste-launder, not shown. The fines with some vegetable fibers, falling on the deflector 6 pass down onto the apron 7 to the fine comb 8, where a further quantity of coarse stones and vegetable fibers are screened out, collecting and passing over the ledge 9, into the same waste-launder that receives the oversize from ledge 4.

It will be noted that the ledge 9 is inclined so as to retard the discharge of the coarse matter; this is advisable where the stream has a high velocity, or is very liquid due to the presence of excess water. Through the comb 8 the fines and some few vegetable fibers pass to and over the deflector plate 10 to the apron 11, from which they pass to the screen plate 12, the apertures 13 of which have a greater diameter than the width of the interspaces in the fine comb, and may have any suitable shape, as round, square, etc. The fines readily pass through the apertures 13 without obstruction to the launder 14 below, while any long thin vegetable fibers, long thin stones, mica, etc., that may have passed the combs, collect on the screen, from which they may be periodically removed.

The structure shown in Fig. 2 is similar to that in Fig. 1, but has suitable mechanical cleaning devices, such as rotating brushes 15, 16, to remove the oversize, including the vegetable fibers, from the combs 3 and 8. This cleaning device, or brush, further serves to scour the oversize and break up earthy lumps, thus discharging a cleaner oversize.

In practice, the gravel, sand, etc., is carried to the device by a flowing stream of water, as in placer mining; the water passing through the combs and screen carrying the fines along with it over suitable gold-saving devices, not shown. As shown, the combs and screen discharge their oversize to the same side of the separator into a common waste-launder; this feature has practical advantages in that it facilitates inspection. A further advantage is that two separators may be placed back to back, making a very compact arrangement, doubling the product per unit of length, and reducing the cost of construction. This arrangement is shown in Fig. 3.

In order that renewals, repairs, etc., may be readily made, the brushes, combs, screens, etc., are arranged to be readily removed. I have shown a separator containing two combs, as I find this ample for many purposes but it is to be understood that the separator may be operated with a single comb; or a greater number than two may be used where the conditions require it.

Fig. 4 illustrates the preferred shape of aperture 13 in screen-plate 12, in which the metal edges of the aperture are so bent that the axis of the aperture is inclined backward up-stream. This may be effected either by inserting a stiff bar in the aperture and bending in the desired direction, or by any other suitable means, thereby depressing one edge and raising the other. Screens so made are more rapid in their screening action than where the axis of the aperture is perpendicular to the plane of the screen. If desired, the upper edge of the aperture may be cut or filed off, as shown at 17, thereby making the screen easier to clean.

I claim:

1. In a separator of the class described, the combination of a comb and a screen arranged to act successively upon materials to be treated, said screen having apertures of a diameter greater than the interspaces of said comb.

2. In a separator of the class described, the combination of a comb and a screen, the screen having apertures of a diameter greater than the width of the interspaces of the comb, and located so as to receive the fines from said comb.

3. In a separator of the class described, the combination of a comb and a screen, the screen having apertures of a diameter greater than the width of the interspaces of the comb, and located so as to receive the fines from said comb, and means to remove oversize from said comb.

4. In a separator of the class described, the combination of a comb and screen placed in the line of travel of material to be treated, means to supply mixed materials to said comb, means to deliver the fines from said comb to said screen, and means to remove the rejected oversize from one side of said comb and screen.

5. In a separator of the class described, the combination of a succession of combs having differing interspaces, and a screen, said combs and screen arranged to act successively upon materials to be treated, and said screen having apertures of a diameter greater than the smallest clearance space between adjacent comb teeth in any comb preceding the screen.

6. In a separator of the class described, the combination of a succession of combs placed in the line of movement of materials to be treated, one of said combs being finer and having narrower interspaces between its teeth than the other or others, and a screen, said screen being located so as to treat the fines from the combs, and having apertures of larger diameter than the width of the spaces in the fine comb.

7. In a separator of the class described, the combination of a succession of combs placed in the line of movement of materials to be treated, and a screen, means to supply mixed materials to said combs, and means to remove rejected oversize from one side of said combs and screen.

8. A separator of the class described, comprising a comb, means to supply materials to be screened thereto, means to discharge coarse material therefrom, means to deflect fine screened material to another comb, whereby it is further screened into coarse and fine material, means to discharge coarse material therefrom, and means to deflect the fine screened material to a screen having apertures of larger diameter than the width of the spaces in the fine comb.

9. In a separator of the class described, the combination of a succession of combs and a screen placed in the line of movement of materials to be separated, means to supply material to be separated to said combs, and means to remove coarse material from said combs.

10. In a separator of the class described, the combination of a succession of combs and a screen placed in the line of movement of materials to be separated, means to supply material to be separated to said combs, and means to remove adhering matter from the coarse material while said coarse material is in said separator.

11. In a separator, the combination of a succession of combs having tines free at one end, and means to supply material to be screened to said combs in such a direction that the oversize and collected matter from said material will pass off the free ends, a lower comb of the succession located in the path of the fines from an upper comb.

12. In a separator of the class described, the combination of a comb, a deflecting launder, and a screen, arranged to act continuously and successively upon solid materials carried in a stream of water, said screen having apertures of greater width than the interspaces of said comb, and adapted to receive the flow from said launder, the discharge ends of said comb and screen being substantially one above the other.

In testimony whereof I affix my signature in presence of two witnesses.

HENRY NOEL POTTER.

Witnesses:
W. J. GRETTEN,
LILLIAN EDMONDS.